June 23, 1925.
C. S. RIDER
1,542,911
MULTIPLE CONNECTION DRY CELL BATTERY
Filed May 23, 1921
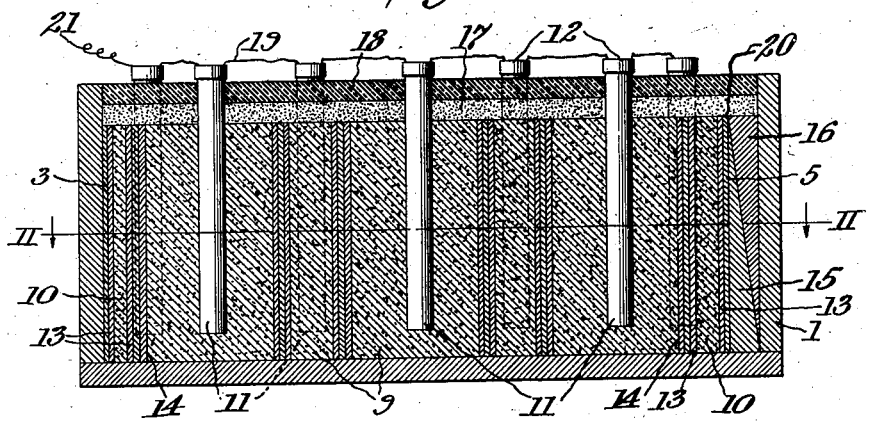
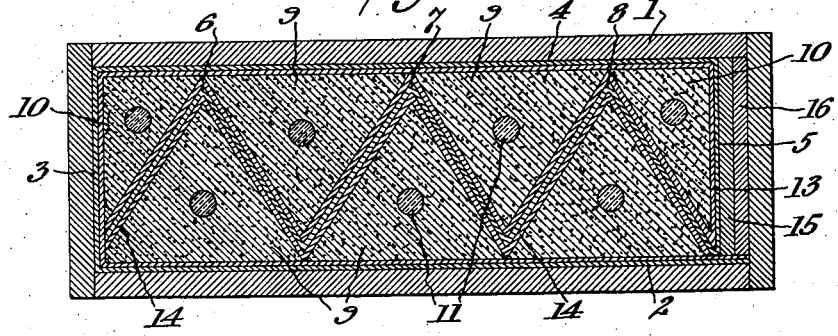
Inventor:
Carl Severus Rider,
by Byrnes, Townsend & Brickenstein,
Attorneys.

Patented June 23, 1925.

1,542,911

UNITED STATES PATENT OFFICE.

CARL SEAVERNS RIDER, OF LANSING, MICHIGAN, ASSIGNOR TO NATIONAL CARBON CO. INC., A CORPORATION OF NEW YORK.

MULTIPLE-CONNECTION DRY-CELL BATTERY.

Application filed May 23, 1921. Serial No. 471,669.

*To all whom it may concern:*

Be it known that I, CARL SEAVERNS RIDER, a citizen of the United States, residing at Lansing, in the county of Ingham and State of Michigan, have invented certain new and useful Improvements in Multiple-Connection Dry-Cell Batteries, of which the following is a specification.

This invention relates to dry cells and has particular reference to an improved battery construction in which the cells are designed for multiple connection and are arranged so as to form a compact unit.

Portable batteries are frequently required for service demanding voltage or amperage which necessitates the use of a relatively large number of cells. In order to avoid the inconvenience arising from the instability of the separate cells and the difficulty of handling them individually, it is the practice to place the requisite number of cylindrical cells of the ordinary commercial type in a box and secure them in position in a more or less rigid manner. A considerable portion of the space occupied by such battery boxes is not usefully employed, due to the lack of conformity between the cylindrical outline of each cell with adjacent cells and the retaining walls of the container.

It is an object of my invention to provide a battery construction, for use where a current of considerable amperage is required, which is compact and capable of being handled as a unit alone, or of being inserted in a container without waste of space. A further object is to provide an improved anode, comprising a surface area of such extent as to secure maximum efficiency and capable of being held under compression against cooperating cathode elements of special form.

The invention will be fully described in connection with the accompanying drawing, in which—

Fig. 1 is a vertical longitudinal section through a battery constructed according to my invention, and Fig. 2 is a horizontal section taken on line II—II of Fig. 1.

Reference numeral 1 denotes a rectangular box or casing which may be of wood, preferably waterproofed. A sheet of zinc or other suitable electropositive metal is bent as shown to form a rectangular casing composed of the sides 2, 3, 4 and 5. The side 5 has an integral extension turned inwardly and formed with serrations 6, 7 and 8, extending approximately the entire width of the rectangle formed by the parallel sides of the zinc sheet. The side 5 remains substantially parallel to side 3 at all times and the last of the serrations lies adjacent to the latter side.

Wedge-shaped mix cakes 9 are fitted into the recesses between the angularly bent portions of the zinc forming the serrations 6, 7 and 8, and smaller bodies of mix 10 occupy the spaces between the serrations and the ends of the rectangular zinc casing. Each of the mix cakes 9 and 10 is provided with a carbon rod 11 having a brass cap 12. The mix will contain the proper amount of moisture and electrolyte and the carbon rod may be embedded therein in any suitable way. If it is desired to reduce the internal resistance as much as possible, the mix may be formed about an electrode of greater area, such as a flat carbon block, for example.

A spacing sheet 13, which may be of pasted pulp-board, lines the rectangular and serrated parts of the zinc electrode and retains the greater portion of its surface out of contact with the mix cakes. The remaining adjacent surfaces of the zinc and carbon electrodes are separated by a spacing sheet 14. The spacing sheets may be replaced by a wrapping for the mix cakes of any suitable material capable of evenly distributing the electrolyte solution to the zinc electrode.

The assembly of cells may be of such size as to fit closely within the box 1. In the construction shown, however, a space has been left at one end for the insertion of wedges 15 and 16. When forced into the position illustrated the cell elements are compressed firmly together, thus preventing loosening of the mix and reducing the internal resistance.

An air space 17 is provided above the cells and may be filled with sand, sawdust or like uncompacted material which will serve as a foundation for a seal of plastic material 18. Wires 19 are shown as joining the carbon electrodes in multiple, though an integral connection is within the scope of my invention.

Terminal connections are made through conductors 20 and 21, leading respectively from the zinc and carbon electrodes. The tops of the carbon rods 10 and the wires 19 may be embedded in the seal 18, and the container 1 provided with a tight-fitting lid.

The shape of the mix cakes is illustrated only by way of example as triangular in cross section. Any conformation which will permit the bodies of mix to be placed in operative relation to an extended area of a continuous metal electrode, and will substantially fill the container, whatever its shape, is within the scope of the invention. Other means may also be applied for compressing the cell elements, as, for example, forcing them together in a press, and binding with metal bands while under compression. In this case, the assembly may be used as such or incased in a suitable insulating and waterproof wrapper. While it is simpler to make the metal electrode integral, separate plates electrically connected in any suitable way may of course be used.

Various other alternative arrangements and changes in shape and relative adjustment of parts may be made within the scope of the appended claims.

I claim:

1. In a battery of dry cells, a plurality of electrodes of one polarity, said electrodes interfitting among themselves to provide a compact mass, and an electrode of opposite polarity adapted to cooperate with said first-mentioned electrodes.

2. In a battery of dry cells, a plurality of cathodes, said cathodes interfitting among themselves to provide a compact mass, and an anode adapted to cooperate with said cathodes.

3. In a battery of dry cells, a plurality of cathode elements arranged to present a serrated surface and an anode member operatively adjacent to the serrations.

4. In a battery of dry cells, a plurality of cathode elements arranged to present a serrated surface upon one side and a flat surface upon another, and an anode operatively adjacent to both the serrated and the flat surfaces.

5. In a battery of dry cells, a plurality of cathode elements arranged to present a serrated surface upon one side and a flat surface upon another, an anode operatively adjacent to both said surfaces, and a group of cathode and anode elements adapted to interfit with those first described, whereby an assembly having only flat exterior faces is formed.

6. In a battery of dry cells, mix cakes of triangular cross section, a spacing sheet upon each face of the mix cakes, and a zinc member abutting upon each spacing sheet.

7. In a battery of dry cells, a metal electrode comprising a part having faces parallel to each other and another part within said parallel faces bent so as to provide angular chambers, and cathode elements within said chambers.

8. An electric battery comprising a casing, a plurality of electrodes of one polarity therein, said electrodes interfitting among themselves to form a compact mass, an electrode of opposite polarity adapted to cooperate with the first-mentioned electrodes, the electrodes of both polarities jointly occupying substantially the entire volume of the casing.

In testimony whereof, I affix my signature.

CARL SEAVERNS RIDER.